US010625416B2

(12) United States Patent
Nakamura et al.

(10) Patent No.: US 10,625,416 B2
(45) Date of Patent: Apr. 21, 2020

(54) ROBOT OPERATION DEVICE AND PROGRAM

(71) Applicant: Hitachi, Ltd., Chiyoda-ku, Tokyo (JP)

(72) Inventors: Ryosuke Nakamura, Tokyo (JP); Azusa Amino, Tokyo (JP); Taishi Ueda, Tokyo (JP); Akihiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 15/568,892

(22) PCT Filed: Mar. 9, 2016

(86) PCT No.: PCT/JP2016/057380
§ 371 (c)(1),
(2) Date: Oct. 24, 2017

(87) PCT Pub. No.: WO2016/189924
PCT Pub. Date: Dec. 1, 2016

(65) Prior Publication Data
US 2018/0099407 A1 Apr. 12, 2018

(30) Foreign Application Priority Data
May 28, 2015 (JP) .................................. 2015-108097

(51) Int. Cl.
*B25J 9/16* (2006.01)
*G06N 20/00* (2019.01)
(Continued)

(52) U.S. Cl.
CPC ............. *B25J 9/163* (2013.01); *B25J 9/1697* (2013.01); *B25J 13/003* (2013.01); *B25J 13/02* (2013.01);
(Continued)

(58) Field of Classification Search
CPC .................. B25J 9/163; B25J 9/16971; G05B 2219/40116; G06N 99/005; G06N 20/00; Y10S 901/46; Y10S 901/47; Y10S 901/03
(Continued)

(56) References Cited

U.S. PATENT DOCUMENTS

2005/0251290 A1* 11/2005 Skourup ................. B25J 9/1664
700/245
2009/0180668 A1* 7/2009 Jones ...................... G06F 3/017
382/103
(Continued)

FOREIGN PATENT DOCUMENTS

JP 5-241649 A 9/1993
JP 7-210234 A 8/1995
(Continued)

OTHER PUBLICATIONS

International Search Report (PCT/ISA/210) issued in PCT Application No. PCT/JP2016/057380 dated Apr. 12, 2016 with English translation (four pages).
(Continued)

*Primary Examiner* — Dalena Tran
(74) *Attorney, Agent, or Firm* — Crowell & Moring LLP

(57) ABSTRACT

In order to make learning efficient for a robot, a robot operation device is provided with operation information input units for generating operation information specifying a state of a robot on the basis of an operation by an operator, a control unit for controlling the robot on the basis of the operation information, a non-operation information collecting unit for collecting non-operation information which is information that relates to the operator and does not affect the state of the robot, an action analysis unit for estimating the state of the operator on the basis of the non-operation information, and an action learning unit for learning the operation of the operator on the basis of the operation
(Continued)

information and the estimation result of the action analysis unit.

5 Claims, 3 Drawing Sheets

(51) Int. Cl.
*B25J 13/02* (2006.01)
*G06N 3/00* (2006.01)
*B25J 13/00* (2006.01)
*B25J 19/02* (2006.01)

(52) U.S. Cl.
CPC ............ *B25J 19/026* (2013.01); *G06N 3/008* (2013.01); *G06N 20/00* (2019.01); *G05B 2219/40116* (2013.01); *Y10S 901/03* (2013.01); *Y10S 901/46* (2013.01); *Y10S 901/47* (2013.01)

(58) Field of Classification Search
USPC ............ 700/108, 245, 253, 257, 259; 901/3
See application file for complete search history.

(56) References Cited

U.S. PATENT DOCUMENTS

| | | | | |
|---|---|---|---|---|
| 2013/0343640 | A1* | 12/2013 | Buehler | B25J 9/0087 |
| | | | | 382/155 |
| 2014/0046128 | A1* | 2/2014 | Lee | A61B 1/00009 |
| | | | | 600/102 |

FOREIGN PATENT DOCUMENTS

| | | |
|---|---|---|
| JP | 9-194186 A | 7/1997 |
| JP | 11-77568 A | 3/1999 |
| JP | 2000-42960 A | 2/2000 |

OTHER PUBLICATIONS

Japanese-language Written Opinion (PCT/ISA/237) issued in PCT Application No. PCT/JP2016/057380 dated Apr. 12, 2016 (three pages).

* cited by examiner

ROBOT OPERATION DEVICE AND PROGRAM

TECHNICAL FIELD

The present invention relates to a robot operation device and program.

BACKGROUND ART

As background art in the technical field of the present invention, the abstract of Patent Literature 1 listed below states that "Instructions usable in offline teaching are provided with richer contents than instructions usable in online teaching. Also, to this end, teaching data is held in an intermediate language. Further, pseudo-instructions are attached to instructions created in the offline teaching and the online teaching and, by determination in a process 131, unnecessary correction of necessary portions is automatically disabled."

Also the abstract of Patent Literature 2 listed below states that "Operation environment creating means 4 builds a robot and an operation situation by using artificial reality with a computer, and operates the robot in the artificial reality world based on operation information detected by operation detecting means 2. Feedback means 5 sequentially feeds back the resultant reactions and physically sensing means 6 presents the reactions in a manner with physical sensations."

CITATION LIST

Patent Literature

Patent Literature 1: Japanese Patent Application Publication No. Hei 5-241649
Patent Literature 2: Japanese Patent Application Publication No. Hei 7-210234

SUMMARY OF INVENTION

Technical Problem

Robots such as industrial robots implement mass production of products and the like by repeating routine actions. However, writing the process of every single action to be performed by a robot is cumbersome. For this reason, Patent Literature 1 employs a technique called "teaching," in which an operator inputs actions to be performed by a robot while checking the posture of the robot. Also, Patent Literature 2 discloses a technique using a neurocomputer to learn a human's actions. However, a problem with these techniques is that the learning of the robot cannot be made efficient.

This invention has been made in view of the above-mentioned circumstances, and an object thereof is to provide a robot operation device and program capable of making learning of a robot efficient.

Solution to Problem

A robot operation device of the present invention for solving the above problem includes: an operation information input unit that generates operation information indicating a state of a robot, based on operation by an operator; a control unit that controls the robot based on the operation information; a non-operation information collection unit that collects non-operation information being information on the operator which does not affect the state of the robot; an action analysis unit that estimates a state of the operator based on the non-operation information; and an action learning unit that learns operation by the operator based on the operation information and a result of the estimation by the action analysis unit.

Advantageous Effects of Invention

According to the robot operation device and program of the present invention, learning of a robot can be made efficient.

DESCRIPTION OF EMBODIMENTS

First Embodiment

Configuration in Embodiment

First, the configuration of a robot operation system in a first embodiment of the present invention will be described with reference to a block diagram illustrated in FIG. 1.

Figure 1:
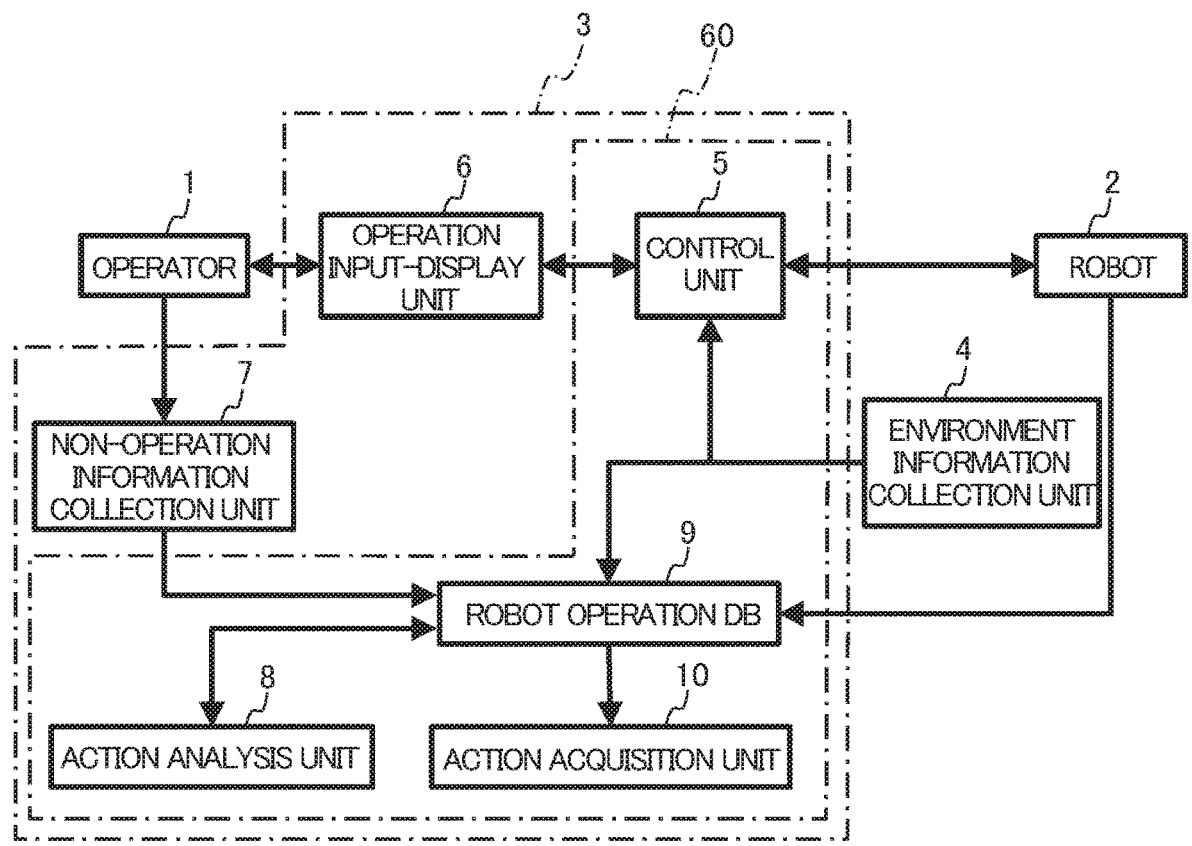
FIG. 1 is a block diagram of a robot operation system in a first embodiment of the present invention.

In FIG. 1, an operator 1 operates a robot 2 by using a robot operation device 3. The robot operation device 3 is constituted of a server machine 60, an operation input-display unit 6, and a non-operation information collection unit 7. An environment information collection unit 4 collects environment information on the environment in which the robot 2 operates, and supplies the collected environment information to the server machine 60.

In particular, the environment information collection unit 4 includes a plurality of cameras that image the robot 2 and its surroundings. The above-mentioned "environment information" includes image information captured by these cameras. The operation input-display unit 6 displays various pieces of information to the operator 1 and supplies operation information to the server machine 60 based on operation by the operator 1. Also, the non-operation information collection unit 7 images the operator 1, collects voice of the operator 1, and supplies the collected image information and voice information to the server machine 60.

The server machine 60 includes hardware as a typical computer such as a CPU (Central Processing Unit), an RAM (Random Access Memory), an ROM (Read Only Memory), and an HDD (Hard Disk Drive). The server machine 60 includes a control unit 5, an action analysis unit 8, a robot operation database 9, and an action acquisition unit 10. These are functions implemented by a program executed by the CPU. These functions will be described later.

Figure 2:
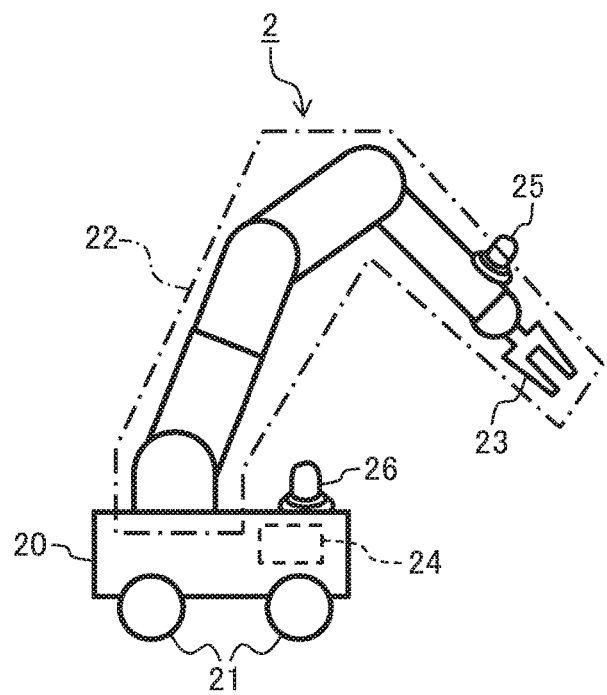
FIG. 2 is a front view of a robot in the first embodiment.

Next, the configuration of the robot 2 will be described with reference to a front view illustrated in FIG. 2.

The robot 2 includes a substantially cuboidal truck 20, and wheels 21 are mounted at four, front, rear, left, and right positions on the bottom of the truck 20. These wheels 21 are driven independently on the left side and the right side. An arm 22 has seven degrees of freedom, and a gripper 23 is mounted at its tip. The gripper 23 includes a pair of gripping members that can open and close, and can grip an item with these gripping members. Further, a gripper camera 25 that images the gripper 23 is mounted near the gripper 23. Furthermore, a truck camera 26 that images the whole arm 22 and a robot control device 24 that controls given parts of the truck 20 are mounted on the truck 20. Note that the gripper camera 25 and the truck camera 26 may also serve as some or all of the cameras included in the environment information collection unit 4.

The robot control device 24 is connected to the control unit 5 by a wireless LAN (Local Area Network) not illustrated, and controls the given parts of the truck 20 in accordance with a control instruction supplied from the control unit 5. Specifically, by driving the wheels 21, the robot control device 24 can control the robot 2 such that the whole robot 2 moves to any position within a flat surface and faces in any direction. Further, by turning shafts such as the joints of the arm 22, the robot control device 24 can cause the arm 22 to assume various postures and drive the gripper 23 to grip an item.

The gripper 23 includes a six-axis force sensor (not illustrated) at its root portion and can measure external force applied to the gripper 23. External force applied to the gripper, the angle and angular speed of each joint of the robot, images obtained from the gripper camera 25 and the truck camera 26 are transmitted to the robot operation device 3.

Figure 3:
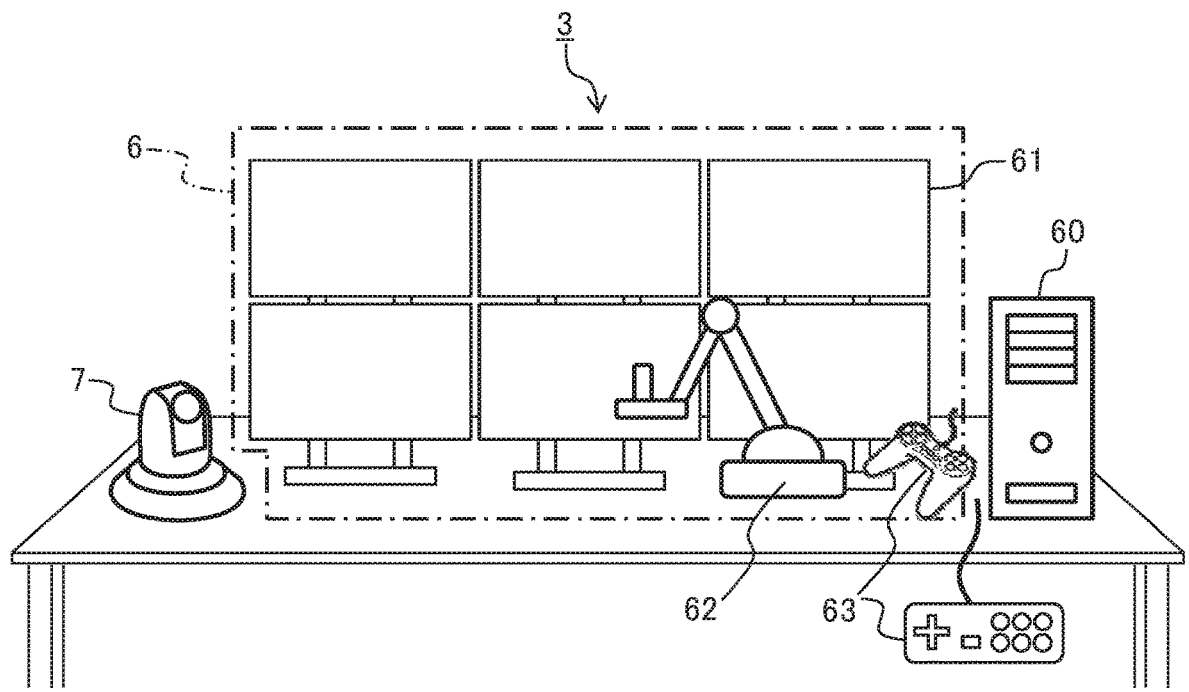
FIG. 3 is a front view of a robot operation device in the first embodiment.

Next, the exterior configuration of the robot operation device 3 will be described with reference to a front view illustrated in FIG. 3.

As mentioned above, the robot operation device 3 is constituted of the server machine 60, the operation input-display unit 6, and the non-operation information collection unit 7. Further, as illustrated in FIG. 3, the operation input-display unit 6 is constituted of a multi-display unit 61, an arm operation device 62, and a moving operation device 63.

In this embodiment, the multi-display unit 61 includes a plurality of displays arranged in a matrix, and displays the following images on these displays.

An image obtained by the control unit 5 by analyzing and visualizing various pieces of data obtained from the robot 2.

Images of the environment in which the robot 2 operates, captured by the plurality of cameras included in the environment information collection unit 4.

Images obtained from the gripper camera 25 and the truck camera 26.

The arm operation device 62 has a shape resembling the shape of the arm 22 and the gripper 23 of the robot 2, and includes joints corresponding to the joints included in the arm 22 and the gripper 23 and sensors that detect motions of these joints. When the operator 1 holds and operates the arm operation device 62, the above-mentioned sensors detect the motions of the joints, and the results of the detection are supplied to the server machine 60 as operation information. Based on this operation information, the server machine 60 instructs the robot control device 24 to cause the arm 22 of the robot 2 to assume a given posture and cause the gripper 23 to perform an opening or closing action.

Also, in each joint of the arm operation device 62 is mounted an actuator (such as a motor) that exerts reactive force against operation by the operator 1 (not illustrated). As mentioned above, the gripper 23 of the robot 2 is provided with a force sensor that measures external force applied. By driving the actuators of the arm operation device 62 based on the result of detection by this force sensor, reactive force can be exerted against the operation by the operator 1. For example, if the mass of an item gripped by the gripper 23 is large, then the external force applied to the gripper 23 is large as well, and the reactive force at each joint is set to be accordingly large.

The moving operation device 63 includes a plurality of buttons, a joystick, or the like. When the operator 1 operates the moving operation device 63, this operation information is supplied to the server machine 60. The server machine 60 drives the wheels 21 based on this operation information to control the position and the direction of the robot 2. The non-operation information collection unit 7 includes a camera that images the operator 1 and outputs the image information and a microphone that collects voice of the operator 1 and outputs the voice information, and supplies these image information and voice information to the server machine 60. Note that the non-operation information collection unit 7 can be implemented with, for example, a USB camera equipped with a microphone.

Meanwhile, while the operator 1 operates the robot 2, the pieces of information outputted from the arm operation device 62 and the moving operation device 63 are pieces of information on operation of states of the robot 2 such as the position, direction, and posture of the robot 2. In this description, these pieces of information will be referred to collectively as "operation information." On the other hand, in this embodiment, the image information and the voice information outputted from the non-operation information collection unit 7 do not directly affect the states of the robot 2 while the operator 1 operates the robot 2. Thus, of pieces of information indicating states of the operator 1, those pieces of information that do not directly affect the states of the robot 2 will be referred to collectively as "non-operation information."

Operation in Embodiment

Next, the operation of the robot operation system in this embodiment will be described. As operation modes of the robot operation device 3, there are two operation modes, "learning mode" and "automatic operation mode." The "learning mode" is an operation mode in which the operator 1 operates the robot 2 to have the robot operation device 3 learn the operation. On the other hand, the "automatic operation mode" is an operation mode in which the robot operation device 3 automatically operates the robot 2 based on the result of the learning in the learning mode. In the following description, the operation in the learning mode will be mainly discussed.

When the operator 1 operates the moving operation device in the learning mode, that operation information is transmitted to the server machine 60. The control unit 5 in the server machine 60 (see FIG. 1) converts this operation information into an instruction that can be interpreted by the robot control device 24 and transmits it to the robot control device 24. As a result, the robot control device 24 drives the wheels 21, thereby moving the robot 2. Similarly, when the operator 1 operates the arm operation device 62, the control unit 5 converts that operation information into an instruction that can be interpreted by the robot control device 24 and transmits it to the robot control device 24. As a result, the robot control device 24 drives the arm 22 and the gripper 23.

As mentioned above, the environment information collection unit 4 collects the environment information on the robot 2 (such as images of the robot 2 and its surroundings) and transmits the collected environment information to the control unit 5 of the server machine 60. Also, the robot 2 constantly transmits information on the postures of the arm 22 and the gripper 23 and the result of detection by the force sensor provided in the gripper 23 (hereinafter, referred to as the robot state information) to the control unit 5 through the robot control device 24.

As described above, the control unit 5 receives the operation information from the arm operation device 62 and the moving operation device 63 (operation information input unit), receives the environment information from the environment information collection unit 4, and receives the robot state information from the robot 2. These pieces of information are supplied also to the robot operation database 9 through the control unit 5.

The robot state information supplied from the robot 2, the environment information supplied from the environment information collection unit 4, and the operation information supplied from the operation input-display unit 6 are supplied to the robot operation database 9 through the control unit 5.

Further, the non-operation information obtained by the non-operation information collection unit 7 is supplied to the robot operation database 9 as well. Then, the robot operation database 9 accumulates these pieces of information thus supplied.

Also, pieces of information accumulated in the robot operation database 9, in particular, the above-mentioned operation information and non-operation information are supplied to the action analysis unit 8. The action analysis unit 8 estimates and analyzes the states of the operator 1 based on the non-operation information, evaluates weighting of the operation information based on that result, and adds the result of that evaluation to the robot operation database 9. Based on information accumulated in the robot operation database 9, the action acquisition unit 10 chooses an acquirable action (learnable action) from actions which the operator 1 has performed using the robot 2, and acquires that action.

Next, details of the action analysis unit 8 will be described with reference a block diagram illustrated in FIG. 4. The action analysis unit 8 is constituted of an image analyzer 81, a voice analyzer 82, an operation analyzer 83, and a weight adjuster 84. Based on the image information on the operator 1 obtained through the non-operation information collection unit 7, the image analyzer 81 calculates the line of sight of the operator 1, and identifies the information the operator 1 is paying attention to, that is, the information the line of sight is pointing at, among the pieces of information displayed on the multi-display unit 61. The information the operator 1 is paying attention to can be considered important information in operating the robot 2.

Various techniques have been known as methods of calculating the line of sight. For example, a method with the following steps S1 to S3 can be employed.

Step S1: Cut out the image of the operator 1 around the eyes from the image information.

Step S2: Detect the positions of the lacrimal caruncle at the inner corner of each eye and the iris of the operator 1 based on color information and luminance information.

Step S3: Detect the direction of the line of sight from the positional relation between the inner corner of the eye and the iris.

The positional relation between the multi-display unit 61, the non-operation information collection unit 7, and the operator 1 has been inputted in the action analysis unit 8 in advance. The image analyzer 81 determines which display the operator 1 is paying attention to by comparing the detected direction of the line of sight with the position of each display. The image analyzer 81 transmits information indicating the display attracting attention, to the weight adjuster 84.

Also, the voice analyzer 82 analyzes voice of the operator 1 and determines whether or not the operation at this moment is fine. Specifically, through voice recognition, the voice analyzer 82 analyzes voice of the operator 1 and determines whether or not that content is included in a preset "failure utterance list." Here, the "failure utterance list" refers to a list of "failure utterances" such for example as a click of the tongue and a mumble produced at the time of a failure. Upon detection of a failure utterance, the voice analyzer 82 notifies the weight adjuster 84 of the detected failure utterance. Also, the operation analyzer 83 determines the level of operation proficiency of the operator 1 and transmits that result to the weight adjuster 84. Specifically, the operation analyzer 83 determines the level of proficiency by calculating the frequency of occurrence of a period in which the operator 1 stops operation and the smoothness of operating actions based on change in posture of the robot 2.

The weight adjuster 84 applies weights to be used in learning to operations performed by the operator 1, based on the analysis results transmitted from the analyzers 81 to 83. Specifically, the weighting is performed with respect to two aspects. The first aspect is "selection of information to be used." In the robot operation system in this embodiment, a plurality of sensors, cameras, and the like are disposed on the robot 2 and the surroundings of the robot 2, and information that the action acquisition unit 10 could use in learning contains many pieces of unnecessary information. The problem with the excess of information is that the information contains many noises for the learning, which will slow down the learning speed.

In this embodiment, the weight adjuster 84 evaluates weighting such that a heavier weight is applied to the information displayed on the "display the operator 1 was paying attention to," which was obtained from the image analyzer 81, whereas a lighter weight is applied to information the operator 1 was not paying much attention to. More specifically, the weight adjuster 84 may identify any "display the operator 1 was paying attention to" at predetermined sampling intervals during a period from the current time back to a time preceding therefrom by a predetermined amount of time, count the number of times the operator 1 paid attention to the display, and evaluate the weighting such that a heavier weight is applied to the information displayed on a display with a larger count result.

The second aspect is "evaluation of the rate of success of operation" by the operator 1. Tasks which the operator 1 has failed or has not been unfamiliar with may become noises and slow down the learning. As mentioned above, upon detection of a certain failure utterance, the voice analyzer 82 notifies the weight adjuster 84 of that content. When notified of the failure utterance by the voice analyzer 82, the weight adjuster 84 applies a lighter-than-normal weight to the very operation performed until right before the notification (for example, the operation performed in a predetermined past period until the content of the utterance is given) so that this operation will be less likely to be learned.

Moreover, the level of operation proficiency of the operator 1 transmitted from the operation analyzer 83 is also used for the second aspect (evaluation of the rate of success of operation). Specifically, in the weight adjuster 84, a table has been stored in advance which specifies the correspondence between levels of operation proficiency to be analyzed by the operation analyzer 83 and weights. Weighting is performed by referring to this table such that a lighter weight is applied to a task with a lower level of operation proficiency whereas a heavier weight is applied to a task with a higher level of operation proficiency. The action acquisition unit 10, illustrated in FIG. 1, is equipped with a machine learning function and performs learning based on information recorded in the robot operation database 9. In the learning, the action acquisition unit 10 refers to the weights added by the action analysis unit 8, adjusts an evaluation function such that those with heavier weights will be more likely to be learned, and uses it.

As described above, according to this embodiment, learning based on the operation information, the environment information, and the robot state information can be weighted based on the non-operation information, which is information on certain states of the operator 1 that does not directly affect the states of the robot 2. In this way, it is possible to determine which information to choose and not to choose from various kinds of information and thus reduce the influence of noise information. Hence, the learning of the robot can be made efficient.

Second Embodiment

Figure 5:
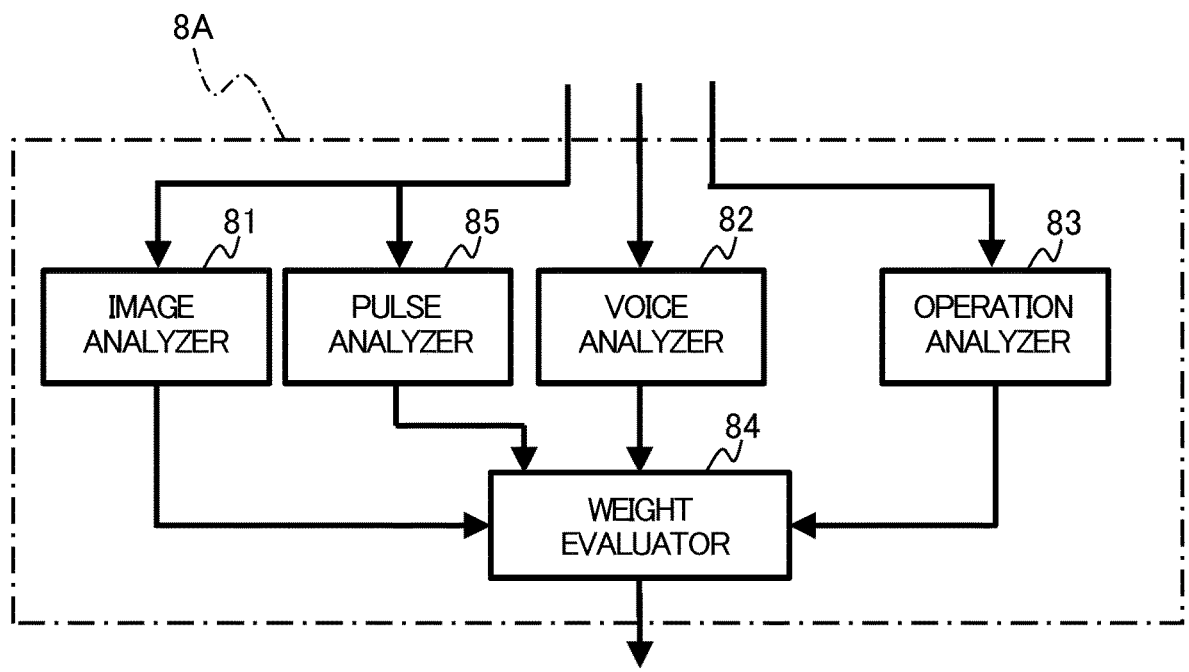
FIG. 5 is a block diagram of an action analysis unit in a second embodiment of the present invention.

Next, a robot operation system in a second embodiment of the present invention will be described. The overall configurations of hardware and software in this embodiment are similar to those in the first embodiment (FIG. 1 to FIG. 3). However, this embodiment differs in that an action analysis unit 8A illustrated in FIG. 5 is employed in place of the action analysis unit 8 in the first embodiment.

Details of the action analysis unit 8A will thus be described with reference to the block diagram illustrated in FIG. 5. The action analysis unit 8A includes analyzers 81 to 83 and a weight adjuster 84, as in the action analysis unit 8 in the first embodiment, and further includes a pulse analyzer 85 that detects the pulse of an operator 1 based on image information. Now, the mechanism of the pulse analyzer 85 will be described. The hemoglobin contained in blood has a nature of absorbing green light. The blood flow, which changes by the pulse, subtly changes the brightness of the green component of the human face, though this is difficult to recognize with the bare eye. Then, the pulse can be detected by capturing this change.

The weight adjuster 84 in this embodiment calculates the pulse rate per minute based on the pulse outputted from the pulse analyzer 85, and evaluates weighting for the pulse rate in addition to those mentioned in the first embodiment. Specifically, when the pulse rate rises, it can be assumed as a "state where the operator 1 is impatient," which can be assumed as a "state where an operation of the robot 2 has failed." Thus, when the pulse rate of the operator 1 rises, the weight adjuster 84 applies such a weight that the very operation performed until right before the rise will not be learned.

As described above, this embodiment achieves an advantageous effect of being able to weight learning according to the pulse rate of the operator 1, in addition to the advantageous effect mentioned in the first embodiment.

Modifications

The present invention is not limited to the above-described embodiments, but various modifications are possible. The above-described embodiments are exemplarily presented to comprehensively describe the present invention, and thus the present invention is not necessarily limited to an invention including all the configurations described above. Also, it is possible to replace a certain configuration in one embodiment with a configuration in another embodiment, and also to add a configuration in one embodiment to a configuration in another embodiment. Moreover, it is possible to remove some configuration in each embodiment or to add or replace another configuration. Possible modifications of the above-described embodiments include the following, for example.

(1) The hardware of the server machine 60 in each of the above-described embodiments can be implemented using a typical computer. Thus, the programs and the like that implement the algorithms illustrated in FIG. 1, FIG. 4, and FIG. 5 may be stored in a storage medium and distributed or distributed through a transfer channel.

Figure 4:
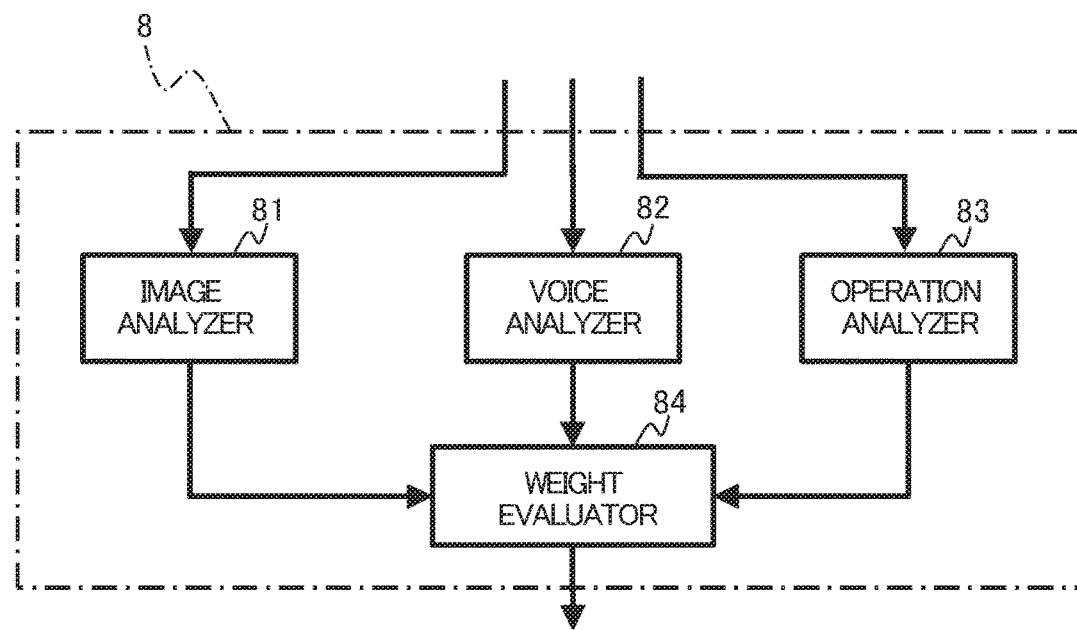
FIG. 4 is a block diagram of an action analysis unit in the first embodiment.

(2) The algorithms illustrated in FIG. 1, FIG. 4, and FIG. 5 have been described in the above-described embodiments as software processing using a program. However, part or entirety of the algorithms may be replaced with hardware processing using an ASIC (Application Specific Integrated Circuit), an FPGA (field-programmable gate array), or the like.

(3) In each of the above-described embodiments, description has been given of a case where the multi-display unit 61, including a plurality of displays arranged in a matrix, is used as a specific example of a "display unit" in the present invention. However, the display unit in the present invention may be a single display. Specifically, different images may be individually displayed on a plurality of regions (display positions) on a single display; which region (display position) has the image the operator 1 is paying attention to may be determined by detecting his or her line of sight; and each piece of information displayed may be weighted based on that result, as in the above-described embodiments.

(4) In the above-described second embodiment, the pulse analyzer 85 detects the pulse rate of the operator 1 based on image information. However, the pulse analyzer 85 may detect the pulse rate with a pulsimeter or the like directly attached to the operator 1.

Overview of Configurations and Advantageous Effects

As described above, the robot operation device (3) in each of the above-described embodiments includes: an operation information input unit (62, 63) that generates operation information indicating a state of a robot (2), based on operation by an operator (1); a control unit (5) that controls the robot (2) based on the operation information; a non-operation information collection unit (7) that collects non-operation information being information on the operator (1) which does not affect the state of the robot (2); an action analysis unit (8) that estimates a state of the operator based on the non-operation information; and an action learning unit (10) that learns operation by the operator (1) based on the operation information and a result of the estimation by the action analysis unit (8).

Thus, the state of the operator (1) can be estimated based on the non-operation information, and operation by the operator (1) can be learned based on the result of this estimation and the operation information. In this way, the learning of the robot (2) can be carried out according to the state of the operator (1). Hence, the learning of the robot (2) can be made efficient.

Also, the robot operation device (3) in each of the above-described embodiments further includes a display unit (61) that displays a plurality of pieces of information at different display positions respectively, the non-operation information collection unit (7) includes a camera that images the operator (1) and outputs image information, the action analysis unit (8) determines which one of the display positions a line of sight of the operator (1) is pointing at, based on the image information, and the action learning unit (8) learns the operation by the operator (1) based on a result of the determination by the action analysis unit (8). Specifically, the action learning unit (10) learns the operation by the operator (1) with a heavier weight applied to the piece of information displayed at the display position than weights applied to the other pieces of information.

In this way, the display position which the line of sight of the operator (1) is pointing at can be determined, and the learning of the robot (2) can be carried out based on the result of the determination. Hence, the learning of the robot (2) can be made efficient.

Also, in the robot operation device (3) in each of the above-described embodiments, the non-operation information collection unit (7) includes a microphone that collects voice of the operator, the action analysis unit (8) determines whether or not the collected voice has a predetermined characteristic, and the action learning unit (10) learns the operation by the operator based on a result of the determination by the action analysis unit (8).

Specifically, in a case where the collected voice has the predetermined characteristic, the action learning unit (10) applies a lighter weight to the operation information generated in a predetermined period including a time when the voice is collected, than a weight applied to the operation information generated in a period excluding the predetermined period.

In this way, whether or not the voice of the operator (1) has the predetermined characteristic can be determined, and the learning of the robot (2) can be carried out based on the result of the determination. Hence, the learning of the robot (2) can be made efficient.

REFERENCE SIGNS LIST 1 operator
2 robot
3 robot operation device
4 environment information collection unit
5 control unit (control part)
6 operation input-display unit
7 non-operation information collection unit
8, 8A action analysis unit (action analysis part)
9 robot operation database
10 action acquisition unit (action learning unit, action learning part)
20 truck
60 server machine (computer)
61 multi-display unit (display unit)
62 arm operation device (operation information input unit)
63 moving operation device (operation information input unit)
81 image analyzer
82 voice analyzer
83 operation analyzer
84 weight adjuster
85 pulse analyzer

The invention claimed is:
1. A robot operation device comprising:
an operation information input unit that generates operation information indicating a state of a robot, based on operation by an operator;
a control unit that controls the robot based on the operation information;
a non-operation information collection unit that collects non-operation information being information on the operator which does not affect the state of the robot;
an action analysis unit that estimates a state of the operator based on the non-operation information;
an action learning unit that learns operation by the operator based on the operation information and a result of the estimation by the action analysis unit; and
a display unit that displays a plurality of pieces of information at different display positions respectively;
wherein the non-operation information collection unit includes a camera that images the operator and outputs image information;
wherein the action analysis unit determines which one of the display positions a line of sight of the operator is pointing at, based on the image information; and
wherein the action learning unit learns the operation by the operator based on a result of a determination by the action analysis unit of which one of the display positions the line of sight of the operator is pointing at.

2. The robot operation device according to claim 1, wherein the action learning unit learns the operation by the operator with a heavier weight applied to the piece of information displayed at the display position than weights applied to the other pieces of information.

3. The robot operation device according to claim 1, wherein
the non-operation information collection unit includes a microphone that collects voice of the operator,
the action analysis unit determines whether or not the collected voice has a predetermined characteristic, and
the action learning unit learns the operation by the operator based on a result of the determination by the action analysis unit.

4. The robot operation device according to claim 3, wherein in a case where the collected voice has the predetermined characteristic, the action learning unit applies a lighter weight to the operation information generated in a predetermined period including a time when the voice was collected, than a weight applied to the operation information generated in a period excluding the predetermined period.

5. A non-transitory computer-readable medium storing a program used in a computer which receives operation information indicating a state of a robot and non-operation information being information on an operator which does not affect the state of the robot, from an operation information input unit that generates the operation information based on operation by the operator and a non-operation information collection unit that collects the non-operation information including image information of the operator captured by a camera, and which controls a robot, the program causing the computer to:
control the robot based on the operation information;
estimate a state of the operator based on the non-operation information;
learn operation by the operator based on the operation information and a result of the estimate;
display a plurality of pieces of information at different display positions on a display screen;
determine which one of the display positions a line of sight of the operator is pointing at, based on the image information; and learn the operation by the operator based on a result of a determination of which one of the display positions the line of sight of the operator is pointing at.

\* \* \* \* \*